(12) United States Patent
Guidez

(10) Patent No.: US 9,003,594 B2
(45) Date of Patent: Apr. 14, 2015

(54) BOLT BUILT INTO A CONNECTOR OF A WIPER ARM FOR AN ON-BOARD WASHING LINE

(75) Inventor: Frédéric Guidez, Cambrai (FR)

(73) Assignee: Peugeot Citroën Automobiles SA, Velizy Villacoublay (FR)

( * ) Notice: Subject to any disclaimer, the term of this patent is extended or adjusted under 35 U.S.C. 154(b) by 253 days.

(21) Appl. No.: 13/574,017

(22) PCT Filed: Dec. 20, 2010

(86) PCT No.: PCT/FR2010/052825
§ 371 (c)(1),
(2), (4) Date: Jul. 19, 2012

(87) PCT Pub. No.: WO2011/089331
PCT Pub. Date: Jul. 28, 2011

(65) Prior Publication Data
US 2012/0284948 A1   Nov. 15, 2012

(30) Foreign Application Priority Data
Jan. 25, 2010  (FR) ..................................... 10 50447

(51) Int. Cl.
*B60S 1/38*   (2006.01)
*B60S 1/40*   (2006.01)
*B60S 1/52*   (2006.01)

(52) U.S. Cl.
CPC .............. *B60S 1/3862* (2013.01); *B60S 1/4038* (2013.01); *B60S 1/524* (2013.01); *B60S 2001/4054* (2013.01)

(58) Field of Classification Search
CPC ...... B60S 1/3862; B60S 1/524; B60S 1/4038; B60S 2001/4054
USPC ........................... 15/250.04, 250.32, 250.351
See application file for complete search history.

(56) References Cited

U.S. PATENT DOCUMENTS 2,168,202 A * 8/1939 Grantham .................. 15/250.04
2,432,690 A * 12/1947 Smulski ..................... 15/250.04
(Continued)

FOREIGN PATENT DOCUMENTS

DE      102007062304 A1    6/2009
DE      102008021457 A1    11/2009
(Continued)

OTHER PUBLICATIONS

International Search Report from corresponding International Application No. PCT/FR2010/052825, mailed Mar. 14, 2011.

*Primary Examiner* — Mark Spisich
*Assistant Examiner* — Andrew A Horton
(74) *Attorney, Agent, or Firm* — Polster, Lieder, Woodruff & Lucchesi, L.C.

(57) ABSTRACT

The invention relates to a motor vehicle windshield wiper, comprising: a windshield wiper blade (42) that is hinged onto a windshield wiper arm (41) by means of an arm/blade connector (43, 44, 45, 51); and a washing liquid-spraying device (47) that is arranged on the windshield wiper blade and connected by means of a Connecting device (49, 53, 57) to a washing liquid delivery channel (46) that extends at least partially along the windshield wiper arm. Said windshield wiper is characterized in that the Connecting device is built into the arm/blade connector so as to automatically connect the spraying device to the delivery channel when Connecting the windshield wiper blade onto the windshield wiper arm and so as to automatically detach the spraying device from the delivery channel when disconnecting the windshield wiper blade from the windshield wiper arm.

5 Claims, 5 Drawing Sheets

(56) References Cited

U.S. PATENT DOCUMENTS

| | | | | |
|---|---|---|---|---|
| 2,483,243 A | * | 9/1949 | Smulski | 15/250.04 |
| 2,549,027 A | * | 4/1951 | Smulski | 15/250.04 |
| 2,582,717 A | | 1/1952 | Pierce | |
| 2,648,865 A | * | 8/1953 | Gordon et al. | 15/250.04 |
| 3,304,569 A | * | 2/1967 | Christensen | 15/250.04 |
| 3,440,678 A | * | 4/1969 | Tibbet | 15/250.04 |
| 3,444,580 A | * | 5/1969 | Black | 15/302 |
| 3,452,932 A | * | 7/1969 | Davies | 34/191 |
| 7,269,876 B2 | * | 9/2007 | Vogt | 15/250.04 |

FOREIGN PATENT DOCUMENTS

| | | | | |
|---|---|---|---|---|
| FR | 2933932 A1 | * | 1/2010 | B60S 1/38 |
| WO | 2010006775 A1 | | 1/2010 | |
| WO | 2010006776 A1 | | 1/2010 | |

* cited by examiner

BOLT BUILT INTO A CONNECTOR OF A WIPER ARM FOR AN ON-BOARD WASHING LINE

CROSS-REFERENCE TO RELATED APPLICATIONS

This application is the US National Stage under 36 U.S.C. §371 of International App. No. PCT/FR2010/052825 filed Dec. 20, 2010, and which claims priority to French App. No. 1050447 filed Jan. 25, 2010, which is hereby incorporated by reference.

BACKGROUND

The present invention relates generally to a windshield wiper device comprising a windshield wiper blade moveably attached to a windshield wiper arm through an arm-blade connector, and more specifically, a windshield wiper device comprising a device for projecting washer fluid on the windshield wiper blade. The present invention is applied specifically in the automotive field.

The windshield of a vehicle is commonly wiped by arms equipped with blades that sweep over the glass surface of the windshield. FIG. 1 shows a windshield wiper arm 1 disconnected from its windshield wiper blade 2. To ensure the connection between the arm and the blade, an arm-blade connector includes a first part 3 integral with the arm, and a second part 4 integral with the blade. One of the parts of the arm-blade connector is a female element while the other part of the connector is a male element, so that the assembly of these two parts forms the windshield wiper blade arm. The first female part 3 is hollow and defines an opening 5 on one of its faces. The second male part 4 comprises a fixed part 6 integral with the blade 2, and a mobile part 7 which fits inside the female part and is provided with a latch 8 intended to cooperate with the opening 5 to lock the two male and female parts together ensuring the arm-blade connection. FIG. 1b only shows the arm-blade connector after connecting together the two parts, male 4 and female 3. The latch 8 of the male part is then positioned in the opening 5 of the female part.

The windshield is normally washed by separate nozzles. However, some recent systems offer a wash directly integrated in the wiper blade. This type of washing reduces the consumption of washer fluid and is more effective in washing. One such example is known from document EP 0 810 133 which discloses a windshield wiper device. FIG. 2 shows a windshield wiper blade 16 moveably attached about a transverse axis of rotation A1 at the free end of a windshield wiper arm. The blade 16 includes a device 20 for projecting washer fluid which is linked through a channel 26 by a washer fluid supply device, whereby channel 26 extends along the windshield wiper arm 12. The arm and the blade are moveable with respect to each other about the transverse axis A1 by a connection device, which is not shown. The channel 26 and projection device 20 are connected by a coupler 28 which comprises a part integral with arm 12 and a part integral with the blade 16, whereby the two parts of the coupler 28 are connected automatically by the pivoting blade 16 around its axis of rotation A1 relative to the arm 12. The objective of the coupler 28 is to guarantee the supply of the washer fluid to the projection device as long as at least a portion of the end piece of the coupler is housed inside the cavity 36. It is therefore necessary to provide an end piece of large enough dimensions with respect to the variations of the relative inclination between blade 16 and the arm 12 when the windshield wiper goes through its glass wiping movements. However, in order to limit the length of the end piece, it is important to arrange the coupler 28 as close as possible to the free end 14 of arm 12.

Nevertheless, a windshield wiper device with integrated projection device such as defined in document EP 0 810 133 has a certain number of disadvantages. Indeed, since the arm and the blade are considered two distinct parts, it is generally expected that the arm will remain on the vehicle throughout the vehicle's life while the windshield wiper blade is a wear component requiring regular replacement. When changing a worn wiper blade, the user must initially mount the blade on the arm about the axis of rotation through the connection mechanism provided for this purpose at the end of the free extremity 14 of the arm. At the same time, the user must ensure the exact orientation of the connecting part, which is secured to the arm, in order to accomplish the connection by rotating the blade around its axis. Any gap between the end piece 34 and the cavity can cause assembly difficulties when making the connection. Furthermore, the coupler is either at a distance from the axis of rotation and in this case the end piece 34 must be relatively long, making its orientation less precise and therefore its insertion in cavity 36 more difficult, or the coupler is arranged in the proximity of the axis of rotation and in this case the end piece 34 can be shorter but consequently will be more rigid requiring very precise orientation to ensure easy insertion in cavity 36. Finally, the principle of a mobile connection in the context of its utilization, by pivoting the end piece in the cavity, results in accelerated mechanical wear of the parts involved, including on the side of the arm, and risk of detachment or fluid leaks between the two parts.

SUMMARY

The present invention remedies the different disadvantages of the prior art documents mentioned above and in particular, provides a windshield wiper device with a simple, robust and reliable integrated projection device.

To this end, a first aspect of the invention relates to a windshield wiper of an automotive vehicle comprising a windshield wiper blade moveably attached to a windshield wiper arm by an arm-blade connector, and a washer fluid projection device arranged on the windshield wiper blade and connected by a coupling device to a washer fluid supply channel extending at least partially along the windshield wiper arm, wherein the coupling device is integrated in the arm-blade connector to automatically connect the projection device with the supply channel during the connection of the windshield wiper blade to the windshield wiper arm and to automatically disconnect the projection device from the supply channel during the disconnection of the windshield wiper blade from the windshield wiper arm. The integration of the coupler in the arm-blade connector simplifies assembly and disassembly of the blade to and from the arm, which requires only one single connection/disconnection operation of the arm-blade connector. Such a coupling is also robust and reliable to the extent that no mechanical stress is placed on the coupler during the distribution of fluid when the windshield wiper blade is in use.

According to an embodiment of the invention, the arm-blade connector is used to lock the coupling device during the connection. Such a system reinforces the robustness of the coupling device and prevents any risk of detachment between the projection device and the supply channel.

According to another embodiment of the invention, the arm-blade connector comprises a first part integral with the arm and a second part integral with the blade and the coupling device comprises a first part integral with the arm and a second part integral with the blade, the first part of the coupling device is integrated in the first part of the arm-blade connector and the second part of the coupling device is integrated in the second part of the arm-blade connector, making the coupling device integral with the arm-blade connector.

According to another embodiment of the invention, in which the first part of the arm-blade connector comprises an opening and the second part of the arm-blade connector includes a latch-lever suitable for being positioned in the opening to ensure the connection between arm and blade, the latch-lever is used to lock the first and second part of the coupling device.

According to another embodiment of the invention, the latch-lever is pin-shaped comprising an upper zone with a large opening for passage of the first part of the head-shaped coupling device and a lower zone with a narrow opening to prevent the passage of this same first part of the coupling device. The latch-lever moves between a high position and a low position. In the low position, the latch-lever allows the head of the coupling device to pass during the connection of the arm-blade connector. In the high position, the latch-lever locks the coupling device once the head has passed through the latch-lever after connection of the arm-blade connector.

According to another embodiment of the invention, the first head-shaped part of the coupling device is suitable for locating inside the opening of the second part of the coupling device. Preferably, a ring-shaped seal installs in the opening.

According to a second aspect, the present invention relates to an automotive vehicle equipped with a windshield wiper according to any of the embodiments of the first aspect of the invention.

According to a third aspect, the invention relates to a method for assembling a windshield wiper blade on a windshield wiper arm comprising a step of connecting the first part of the arm-blade connector, which is integral with the arm, with a second part of this arm-blade connector, which is integral with the blade, wherein it comprises a simultaneous step of automatically coupling, during the connection step of the arm-blade connector, the first part of a coupling device integrated in the first part of the arm-blade connector, with the second part of the coupling device integrated in the second part of the arm-blade connector. Preferably, a locking step of the coupling device is also simultaneously taking place during the connection of the two parts of the arm-blade connector.

According to a fourth aspect, the invention relates to a method for disassembling a windshield wiper blade from a windshield wiper arm, comprising the step of disconnecting a first part of the arm-blade connector, which is integral with the arm, from a second part of this arm-blade connector, which is integral with the blade, wherein it comprises a simultaneous step of automatically separating during the disconnect step of the arm-blade connector, the first part of a coupling device integrated in the first part of the arm-blade connector from a second part of the coupling device integrated in the second part of the arm-blade connector.

DESCRIPTION OF THE DRAWINGS

Other characteristics and advantages of the present invention will become clear by reading the following detailed description of the embodiments of the invention provided as non-limiting examples and illustrated by the attached drawing, in which.

In the accompanying drawings which form part of the specification.

Corresponding reference numerals indicate corresponding parts throughout the several figures of the drawings.

DETAILED DESCRIPTION

Figure 1A:
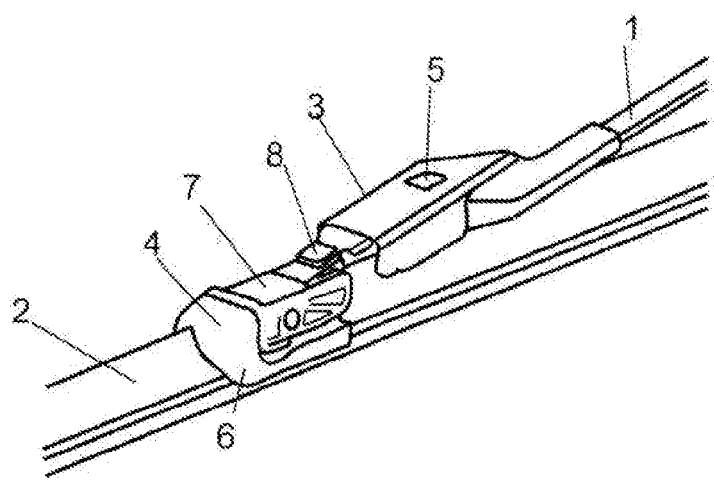
FIG. 1a is a perspective view according to prior art of an arm-blade connector in a disconnected position.

The following detailed description illustrates the claimed invention by way of example and not by way of limitation. The description clearly enables one skilled in the art to make and use the claimed invention, describes several embodiments, adaptations, variations, alternatives, and uses of the claimed invention, including what is presently believed to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

One of the main goals of the present invention is to be able to connect and disconnect a windshield wiper blade equipped with a projection device, such as for instance, a washing ramp, in one single, simple, reliable and robust manual operation instead of two operations.

Figure 1B:
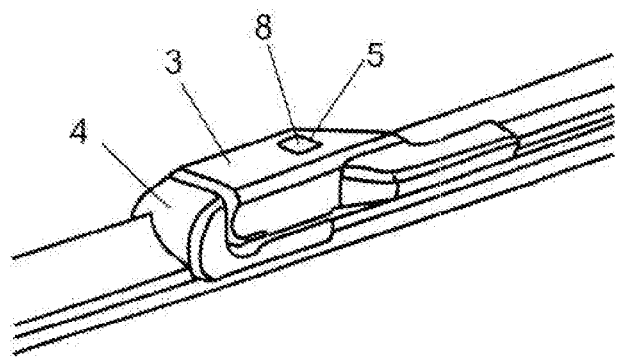
FIG. 1b is a perspective view according to prior art of the arm-blade connector of FIG. 1a in a connected position.
Figure 2:
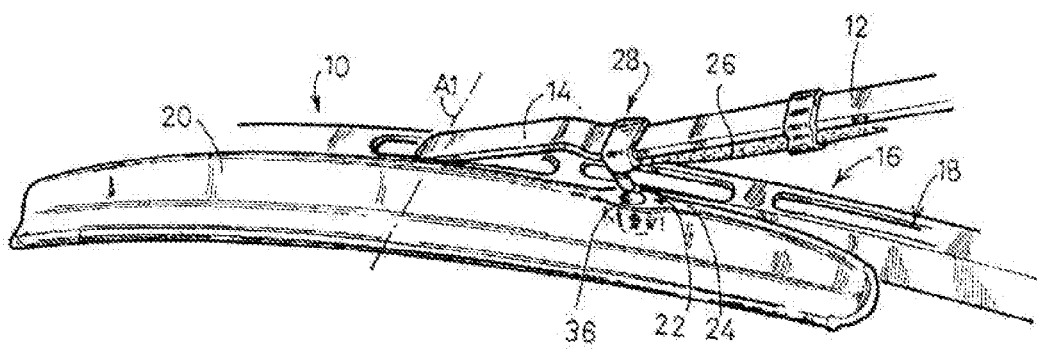
FIG. 2 is a perspective view according to prior art of a windshield wiper device incorporating a projection device.
Figure 3:
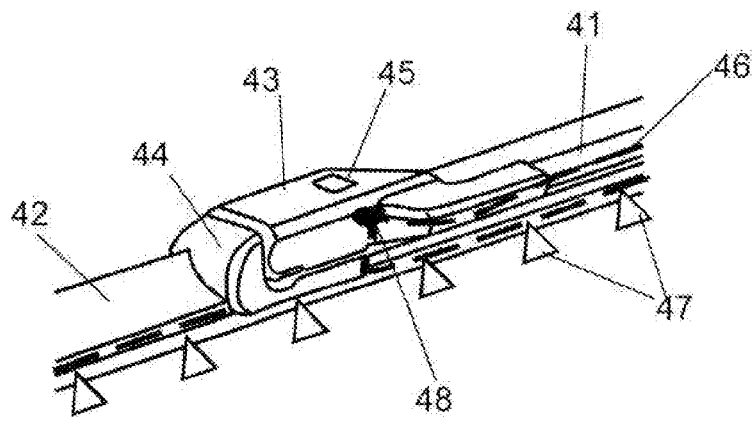
FIG. 3 is a perspective schematic view in of an arm-blade connector incorporating a coupling according to a preferred embodiment of the invention.

To this end, starting from an arm-blade quick coupling as shown in FIG. 3, similar to the one shown in FIGS. 1a and 1b, the concept includes integrating a coupling device through which the supply channel, integrated in the arm, connects with the channel connected to the blade to supply in this way the projection device mounted on the blade. FIG. 3 shows a windshield wiper blade 42 mounted an a windshield wiper arm 41 by means of an arm-blade connector comprising a first part 43 integral with the arm and a second part 44 integral with the blade. A supply channel 46 associated with arm 41 connects to a washer fluid supply device (not shown) which supplies one or more washer fluid projection devices 47 arranged on the blade. The projection device connects to the supply channel 46 of the arm with a coupling device 48 integrated in the arm-blade connector.

Figure 4:
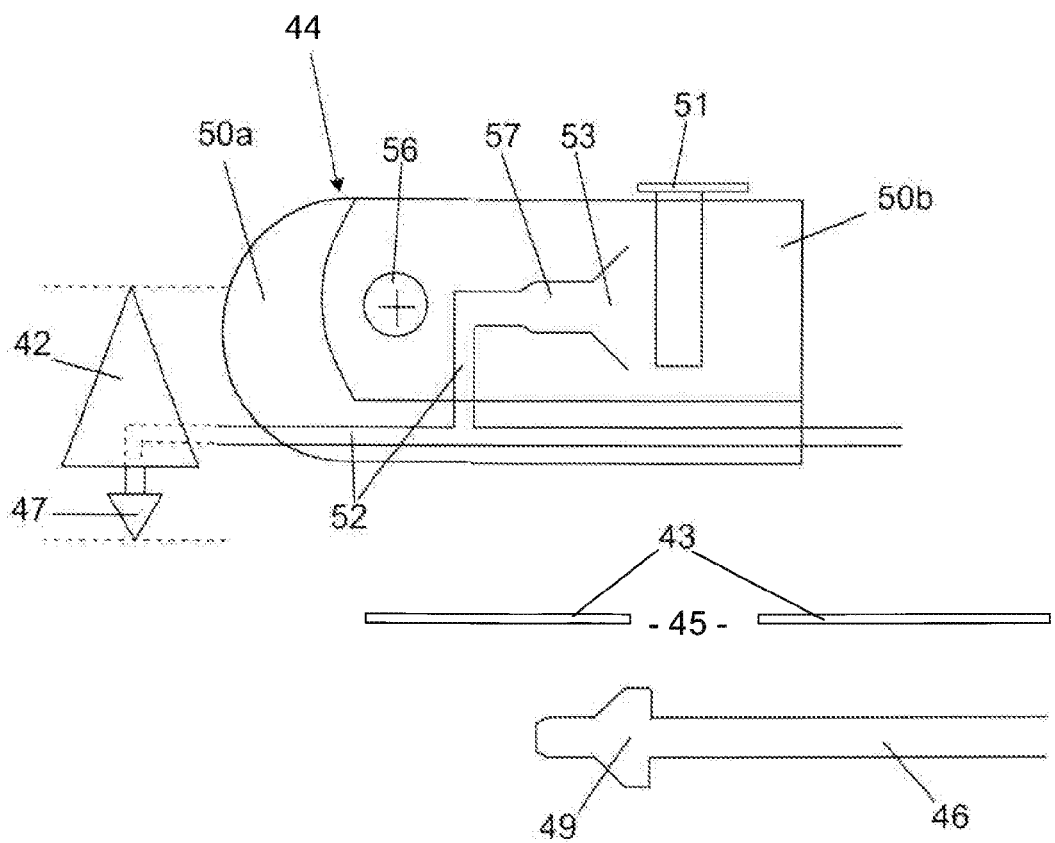
FIG. 4 is an overhead view of the arm-blade connector in the disconnected position according to a preferred embodiment of the invention.

In the following description, we will describe a preferred embodiment of the coupling device integrated in the arm-blade connector. First of all, we will refer to FIG. 4 showing a view of the arm-blade connector in a position in which the parts linked to the arm (not visible) on the one side and linked to the blade 42 on the other side are disconnected. The arm-blade connector comprises a first part 43 integral with the arm inside which the supply channel 46 is integrated. The first part 43, which is selected female, is hollow and defines an opening 45 on one of its faces. The supply channel 46 comprises in its extremity, situated on the side of the arm inside the arm-blade connector, a head 49 intended to interlock inside a corresponding opening on the blade side.

The arm-blade connector comprises a second part 44, selected male, integral with blade 42. This second part comprises a fixed part 50a and a movable part 50b attached to the fixed part about an axis of rotation 56 and interlocking inside the female part 43 of the arm-blade connector, which is integral with the arm. This movable part 50b is equipped with a latch-lever 51 intended to cooperate with the opening 45 to lock the two male and female parts 44,43 together ensuring the arm-blade connection. Inside the second part 44 of the arm-blade connector is integrated a part 57 of the coupling device with the supply channel 46, in the form of a coupling channel 52 linked with the projection devices 47 arranged on the blade, and of which the opposite extremity has an opening 53 intended to receive the head 49 of the supply channel.

Figure 5:
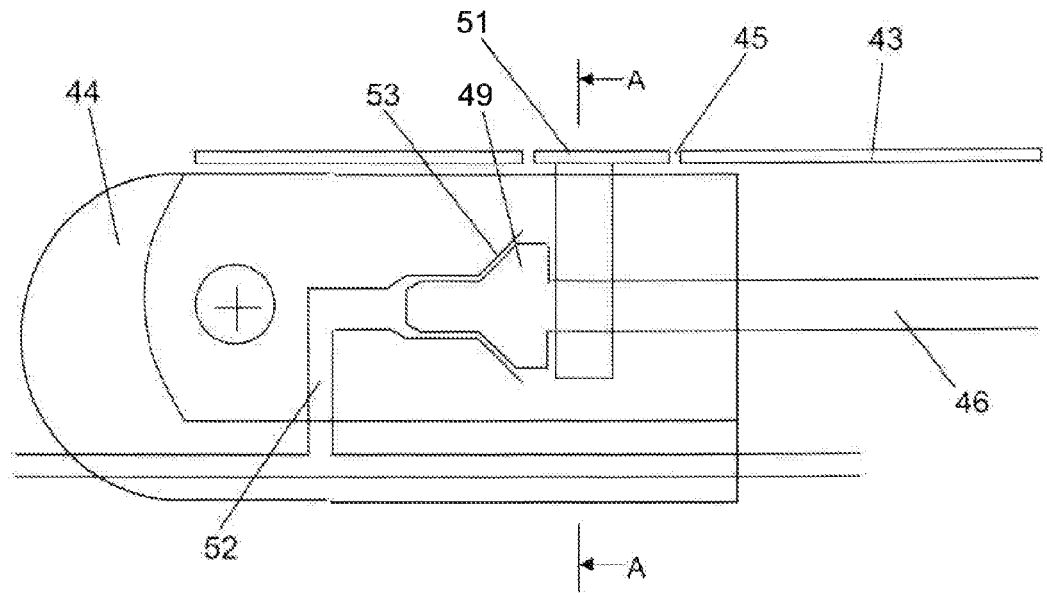
FIG. 5 is an overhead view of the arm-blade connector in the connected position.

FIG. 5 shows a view of the arm-blade connector in a position in which the arm-blade connector is assembled, whereby the first part 43 integral with the arm connects to the second part 44 integral with the blade. In this Figure, we note that latch-lever 51 fits inside the opening 45 while at the same time the head 49 of the male part 44 of the coupling device moves automatically inside the opening 53 of the female part 43 of the coupling device, so that the projection device can be supplied with washer fluid. To ensure perfect sealing of the coupling device, it is advantageous to place a seal ring (not shown) in the opening 53.

To arrive at this locked position, the user must push the blade (not visible in this Figure) in the direction of the arm (also not shown in this Figure) to assemble the blade on the arm. There is no need to apply pressure on the latch-lever 51. When pushing, the supply channel 46 and the coupling channel 52 assemble together thanks to the quick coupling device (opening and head) provided for this purpose. At the same time, when pushing, the blade assembles to the arm thanks to the arm-blade connector provided for this purpose, by assembling together the two parts, male 43 and female 44, of the connector.

Figure 6:
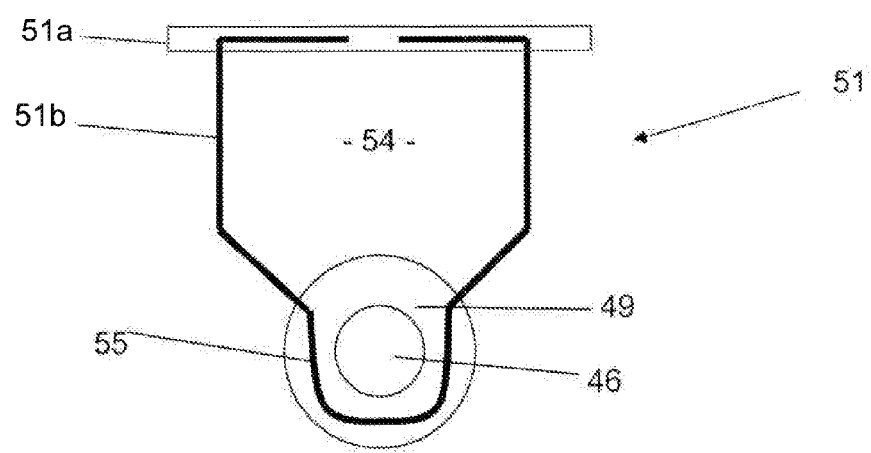
FIG. 6 is a view of the connector according to line A-A of FIG. 5.

FIG. 6 is a view of the connector according to section A-A of FIG. 5. This Figure shows that latch-lever 51 preferably has a flat upper surface 51a and a lower pin shaped part 51b with an upper zone 54 with a large opening and a lower zone 55 with a narrow opening. When the blade is pushed towards the arm, the head 49 of the supply channel passes through the upper zone 54 of the latch-lever 51 with the large opening. Then when the head 49 has completely traversed the latch-lever 51, the head 49 inserts in the opening 45 of the female part 43 of the arm-blade connector, going up one notch so that the head locates opposite the lower opening 55 with the narrow opening. In this position the head 49, which is integrated with the extremity of the supply channel 46, is locked by the latch-lever 51 and therefore remains in position in the opening.

Figure 7:
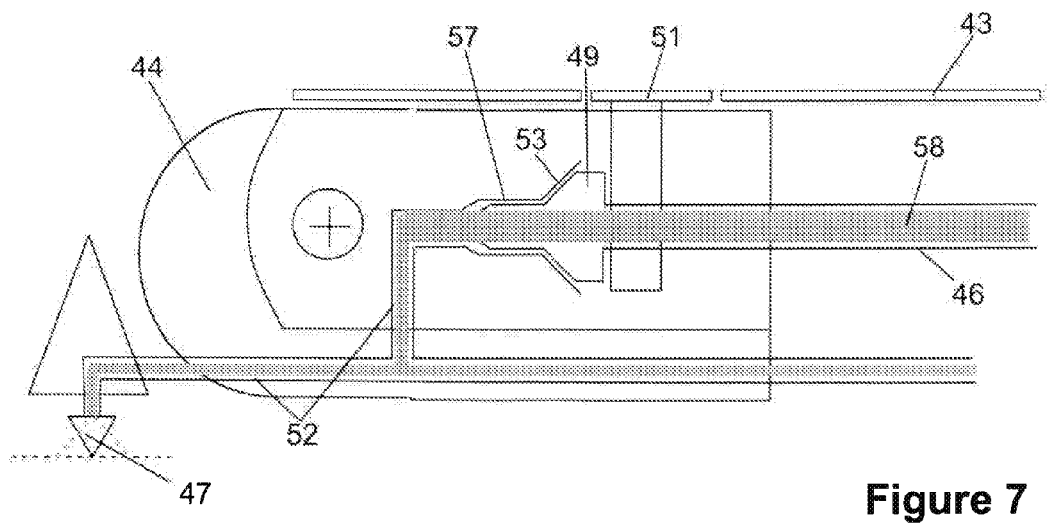
FIG. 7 is an overhead schematic view of the arm-blade connector in the connected position during the operation of the projection device.

FIG. 7 shows a view of the arm-blade connector in its connected position, and with the projection device 47 working. The washer fluid 58 is supplied from a (not shown) reservoir situated on the vehicle through the supply channel 46 up to the coupling device (opening 53 and head 49) automatically locked by the latch-lever 51 during the connection of the arm-blade connector (male part 43 and female part 44), then from this coupling device up to the projection device 47 either directly or with a coupling channel 52.

Figure 8:
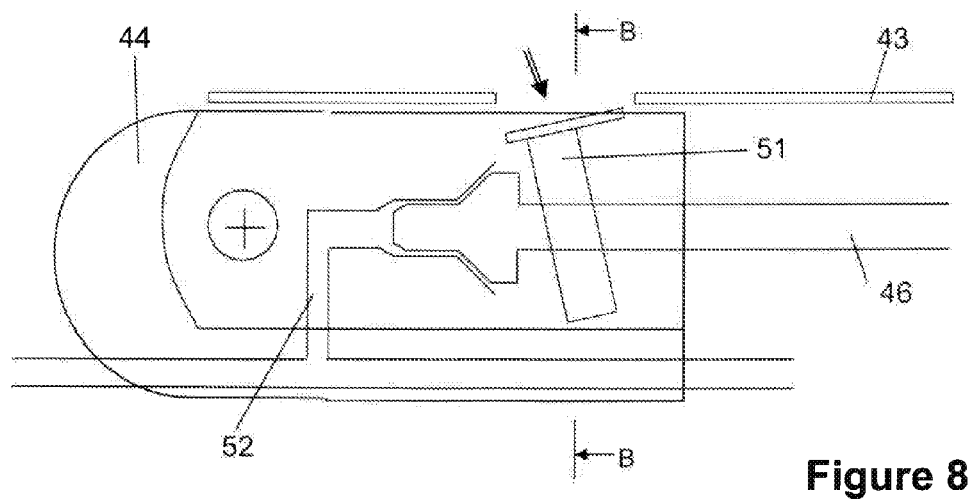
FIG. 8 is an overhead schematic view of the arm-blade connector during the disconnection step.
Figure 9:
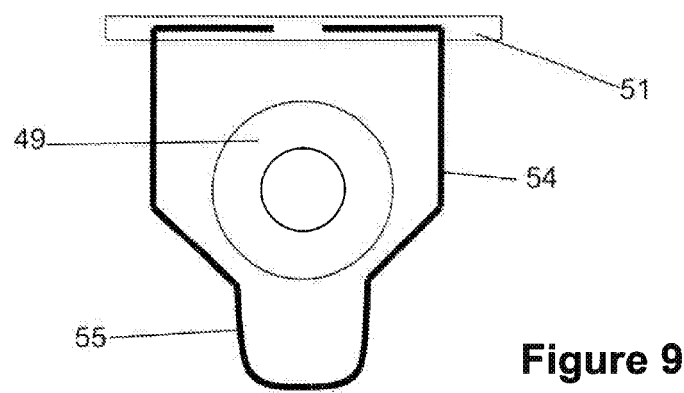
FIG. 9 is a section view of the connector according to line B-B of FIG. 8.

FIG. 8 shows a view of the arm-blade connector during its disconnection. To do this, the user must depress the system which allows for the separation of the arm and the blade, in other words latch-lever 51. When depressed, the latch-lever 51 will go down while rocking to release the male part 43 of the arm-blade connector from the female part 44. At the same time, as shown in section B-B (FIG. 9), the downward movement of the latch-lever 51 entails a displacement of the opening zones 54 and 55 relative to the coupling device, so that the head 49 is positioned opposite the upper zone 55 with the large opening. The quick coupling device is then in an open position, in other words, not locked by the latch-lever, so that the supply channel 46 and the coupling channel 52 can be released.

Figure 10:
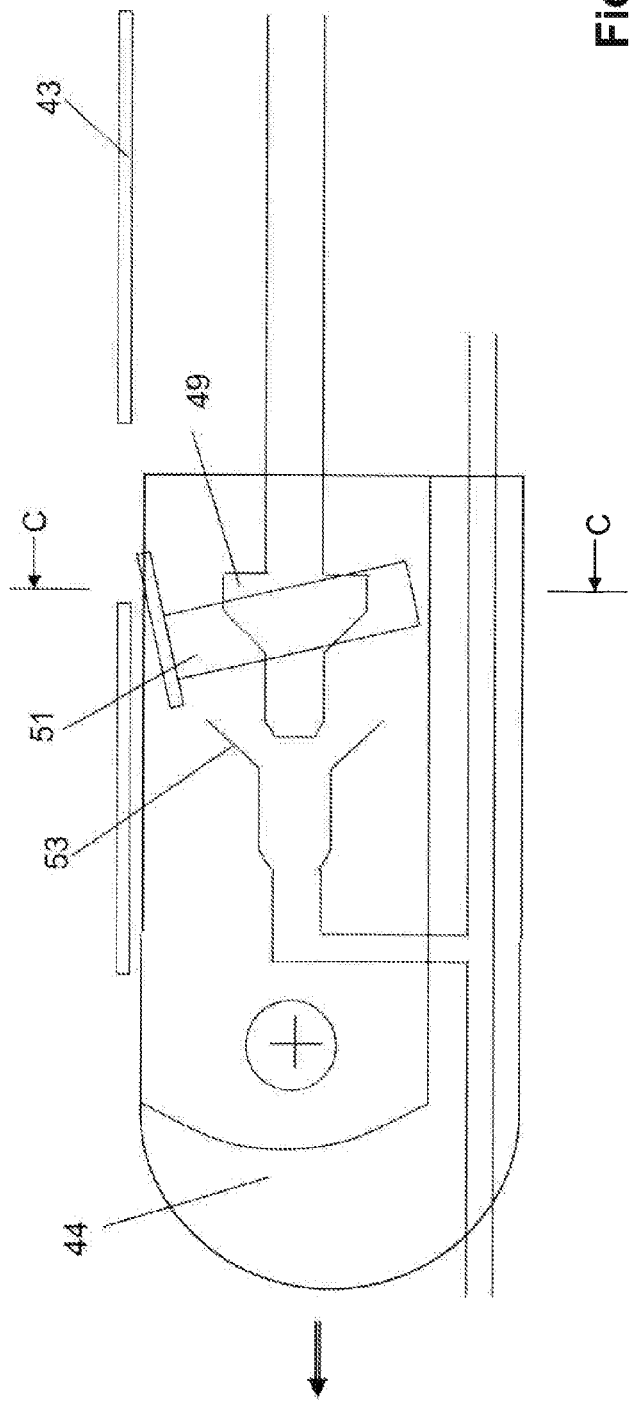
FIG. 10 is an overhead schematic view of the arm-blade connector following the connection step.
Figure 11:
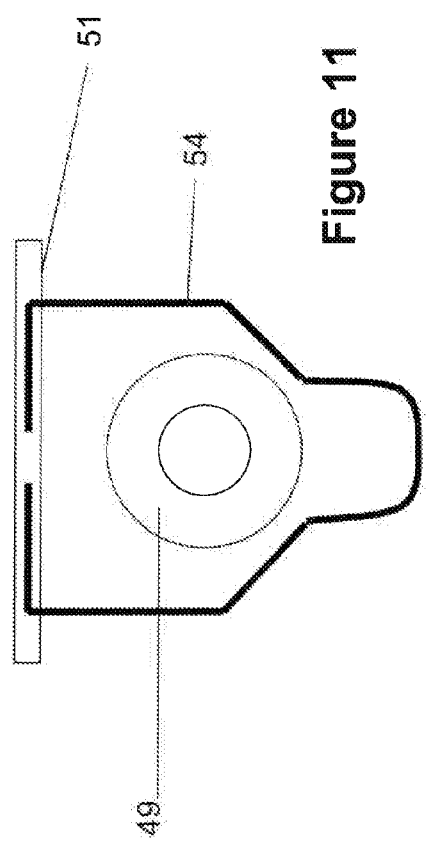
FIG. 11 is a section view of the connector according to line C-C of FIG. 10.

FIG. 10 shows a view of the arm-blade connector following its disconnection by the user. To this end, the user must simply pull the blade in the opposite direction of the arm to separate on the one hand the blade from the arm, and on the other hand the projection device from the supply channel. Note on this Figure that the latch-lever 51 is no longer housed in opening 45, since the male and female parts 43 and 44 of the arm-blade connector are separated, so that the blade is separated from the arm, while at the same time, head 49 automatically passes through the upper zone 54 with large opening of latch-lever 51 as shown in section C-C (FIG. 11).

It is understood that various modifications and/or improvements, evident for a person skilled in the art, can be made to the different implementation modes of the invention described in the present description, without exceeding the scope of the invention defined by the attached claims. In particular, the present invention was presented on the basis of a bayonet type arm-blade connection, although it is possible to provide an automatic system for simultaneous connection of the blade to the arm and to the projection device with the washer fluid reservoir, with other types of arm-blade connectors.

Changes can be made in the above constructions without departing from the scope of the disclosure, it is intended that all matter contained in the above description or shown in the accompanying drawings shall be interpreted as illustrative and not in a limiting sense.

The invention claimed is:

1. A windshield wiper for automotive vehicle comprising:
 a windshield wiper blade articulated on a windshield wiper arm with an arm-blade connector, and a washer fluid projection device arranged on the windshield wiper blade and connected by a coupling device to a washer fluid supply channel extending at least in part along the windshield wiper arm;
 wherein the coupling device is integrated in the arm-blade connector for automatic coupling of the projection device with the supply channel during the connection of the windshield wiper blade to the windshield wiper arm and for automatic decoupling of the projection device from the supply channel during the disconnection of the windshield wiper blade from the windshield wiper arm;

wherein the arm-blade connector comprises a connector first portion integral with the arm and a connector second portion integral with the blade;

wherein the coupling device comprises a coupling first part integral with the arm and a coupling second part integral with the blade, wherein the coupling first part is integrated in the connector first portion and the coupling second part is integrated in the connector second portion, making the coupling device integral with the arm-blade connector;

the connector first portion defining an opening and the connector second portion including a latch-lever suitable to be positioned in said opening to ensure the connection between the arm and the blade, wherein the latch-lever is used to lock the coupling first part and the coupling second part together; and wherein the latch-lever is pin-shaped and comprises an upper zone with an opening sized to allow for the passage of a head-shaped part of the first part of the coupling device and a lower zone with an opening sized to prevent the passage of the head-shaped part of the first part of the coupling device, said opening of said lower zone being smaller than the opening of the upper zone.

2. A windshield wiper according to claim 1, wherein the arm-blade connector is used to lock the coupling device during the connection.

3. The windshield wiper according to claim 1, wherein the first part of the coupling device defines an enlarged head that is suitable for insertion inside a head-receiving opening of the second part of the coupling device.

4. The windshield wiper according to claim 3, further comprising a ring seal installed in the head-receiving opening.

5. An automotive vehicle equipped with a windshield according to claim 1.

* * * * *